(12) United States Patent
MacInnis (10) Patent No.: US 9,083,986 B2
(45) Date of Patent: Jul. 14, 2015

(54) METHOD AND SYSTEM FOR ADAPTIVE RATE VIDEO COMPRESSION AND TRANSMISSION

(75) Inventor: Alexander G. MacInnis, Los Altos Hills, CA (US)

(73) Assignee: BROADCOM CORPORATION, Irvine, CA (US)

( * ) Notice: Subject to any disclaimer, the term of this patent is extended or adjusted under 35 U.S.C. 154(b) by 566 days.

(21) Appl. No.: 12/769,458

(22) Filed: Apr. 28, 2010

(65) Prior Publication Data

US 2010/0278271 A1    Nov. 4, 2010

Related U.S. Application Data (60) Provisional application No. 61/174,569, filed on May 1, 2009, provisional application No. 61/179,533, filed on May 19, 2009.

(51) Int. Cl.
*H04N 7/12* (2006.01)
*H04N 19/59* (2014.01)
*H04N 19/172* (2014.01)
(Continued)

(52) U.S. Cl.
CPC ............ *H04N 19/59* (2014.11); *H04N 19/132* (2014.11); *H04N 19/146* (2014.11); *H04N 19/172* (2014.11); *H04N 19/174* (2014.11);
(Continued)

(58) Field of Classification Search
CPC .............. H04N 19/00169; H04N 19/00127; H04N 19/00272; H04N 19/00757; H04N 19/00266; H04N 19/00781; H04N 19/00903; H04N 19/00751; H04N 19/00309
USPC .......................................................... 375/240
See application file for complete search history.

(56) References Cited

U.S. PATENT DOCUMENTS 5,548,324 A * 8/1996 Downs et al. ............... 348/14.1
6,600,836 B1   7/2003 Thyagarajan et al.
(Continued)

OTHER PUBLICATIONS

US Office Action for U.S. Appl. No. 12/770,524 dated May 9, 2012.
(Continued)

*Primary Examiner* — Tat Chio
*Assistant Examiner* — Nguyen Truong
(74) *Attorney, Agent, or Firm* — Foley & Lardner LLP; Christopher J. McKenna; Daniel E. Rose (57) ABSTRACT

For a portion of video data, a video processing device generates a plurality of compressed video bit streams comprising different bit rates, and selects one stream per portion of video data to transmit to a display device. The streams may be generated concurrently. Bit rates are determined based on operating conditions and link performance. The selections are determined dynamically in response to received information. The streams may be compressed utilizing different compression schemes, for example, DPCM and/or transform compression. The bit rates may be dynamically adjusted by adjusting compression scheme, compression parameters, frame size, frame rate, color space and/or chroma sampling. The portion of video data may comprise contiguous horizontal rows or portions of rows of pixels, a full frame and/or a scaled frame. Information is communicated to the display device for control of decompression operations. The display device receives, decompresses, reconstructs and displays the selected bit stream.

22 Claims, 5 Drawing Sheets

(51) Int. Cl.
*H04N 19/61* (2014.01)
*H04N 19/132* (2014.01)
*H04N 19/146* (2014.01)
*H04N 19/174* (2014.01)
*H04N 19/184* (2014.01)
*H04N 19/587* (2014.01)
*H04N 19/85* (2014.01)

(52) U.S. Cl.
CPC ........... *H04N19/184* (2014.11); *H04N 19/587* (2014.11); *H04N 19/61* (2014.11); *H04N 19/85* (2014.11)

(56) References Cited

U.S. PATENT DOCUMENTS

| | | | |
|---|---|---|---|
| 6,628,300 | B2 | 9/2003 | Amini et al. |
| 6,671,322 | B2 | 12/2003 | Vetro et al. |
| 7,453,937 | B2 | 11/2008 | Henocq et al. |
| 7,496,236 | B2 | 2/2009 | Fogg |
| 7,649,938 | B2 * | 1/2010 | Chen et al. ............... 375/240.01 |
| 7,797,454 | B2 * | 9/2010 | Apostolopoulos et al. ... 709/247 |
| 7,920,747 | B2 | 4/2011 | Gabriel et al. |
| 2003/0026477 | A1 | 2/2003 | Ishiga |
| 2003/0039408 | A1 | 2/2003 | Smith |
| 2003/0138041 | A1 * | 7/2003 | Moore et al. .................. 375/240 |
| 2005/0002453 | A1 * | 1/2005 | Chang et al. ............. 375/240.03 |
| 2005/0123058 | A1 * | 6/2005 | Greenbaum et al. ..... 375/240.28 |
| 2007/0274381 | A1 | 11/2007 | Li et al. |
| 2008/0084927 | A1 | 4/2008 | Rosenzweig et al. |
| 2009/0019178 | A1 * | 1/2009 | Melnyk et al. ................ 709/233 |
| 2009/0168894 | A1 | 7/2009 | Marpe et al. |
| 2010/0080283 | A1 * | 4/2010 | Ali et al. .................. 375/240.01 |
| 2010/0189183 | A1 | 7/2010 | Gu et al. |
| 2010/0232497 | A1 | 9/2010 | MacLnnis et al. |
| 2010/0278271 | A1 | 11/2010 | MacLnnis |

OTHER PUBLICATIONS

US Office Action for U.S. Appl. No. 12/770,524 dated Jul. 16, 2014.
US Office Action for U.S. Appl. No. 12/770,524 dated Aug. 30, 2012.
US Office Action on U.S. Appl. No. 12/770,524 DTD Dec. 12, 2014.

* cited by examiner

METHOD AND SYSTEM FOR ADAPTIVE RATE VIDEO COMPRESSION AND TRANSMISSION

CROSS-REFERENCE TO RELATED APPLICATIONS/INCORPORATION BY REFERENCE

This application makes reference to, claims priority to, and claims the benefit of:
U.S. Provisional Application Ser. No. 61/174,569, which was filed on May 1, 2009; and
U.S. Provisional Application Ser. No. 61/179,533, which was filed on May 19, 2009.

This application also makes reference to:
U.S. patent application Ser. No. 12/770,524, which was filed on Apr. 29, 2010; and
U.S. patent application Ser. No. 12/720,273, which was filed on Mar. 9, 2010.

Each of the above stated applications is hereby incorporated herein by reference in its entirety.

FIELD OF THE INVENTION

Certain embodiments of the invention relate to communication systems. More specifically, certain embodiments of the invention relate to adaptive rate video compression and transmission.

BACKGROUND OF THE INVENTION

Digital video capabilities may be incorporated into a wide range of devices, for example, digital televisions, digital direct broadcast systems, digital recording devices, gaming consoles, digital cameras and many various handheld devices such as mobile phones. Video data may be received and/or may be generated by a video processing device and may be delivered to a display device, for example, a set-top-box, a computer, a camera or a disk player may process video data and may communicate the results to a to a display device. Uncompressed video may be transmitted from a video processing unit to a display or television using various media and/or formats.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for adaptive rate video compression and transmission.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for adaptive rate video compression and transmission. In accordance with various embodiments of the invention, a video processing device that is communicatively coupled to a display device via a communication link, may be operable to receive video data from a video source. The video processing device may generate, from a portion of the received video data, a plurality of compressed video bit streams comprising a plurality of different bit rates. One or more of the compressed video bit streams may be dynamically selected and may be transmitted to the display device. Two or more of the plurality of compressed video bit streams may be generated concurrently. One or more of the plurality of bit rates may be determined based dynamically changing operating conditions and/or link performance during prior transmissions to the display device. Which one of the compressed video bit streams to select, may be determined dynamically in response to information received from one or more communication devices that are coupled via the communication link. The plurality of compressed video bit streams comprising the plurality of bit rates may be generated utilizing a plurality of compression schemes and/or a single compression scheme. One or more of the plurality of compressed video bit streams may be generated utilizing one or both of DPCM compression and transform compression. One or more of the plurality of bit rates may be dynamically adjusted. For example, one or more of the plurality of bit rates may be dynamically adjusted by adjusting the compression scheme, compressed video bits per pixel format, frame size, frame rate, color space and/or chroma sampling. The portion of the video data that is compressed to generate the plurality of compressed video bit streams, may comprise, for example, a plurality of contiguous horizontal rows of pixels, a portion of one or more rows of pixels, a full frame of pixels and/or a scaled frame of pixels. Notwithstanding, the invention is not limited with regard to the portion of video data that is compressed to generate the plurality of compressed video bit streams and any suitable portion may be utilized. Information about the dynamically selected, compressed video bit stream may be communicated to the display device, and may be utilized to control decompression operations performed by the display device. The display device may receive the one or more selected video bit streams and may determine a decompression function that may invert a compression function that was utilized by the video processing device. The display device may decompress the received video bit streams and may reconstruct the video data from results of the decompression. The display device may provide the reconstructed video data to a display screen. In this manner, a video processing device may be operable to respond to variable and/or unpredictable operating conditions by selecting from a plurality of compressed video bit streams comprising different bit rates.

Figure 1:
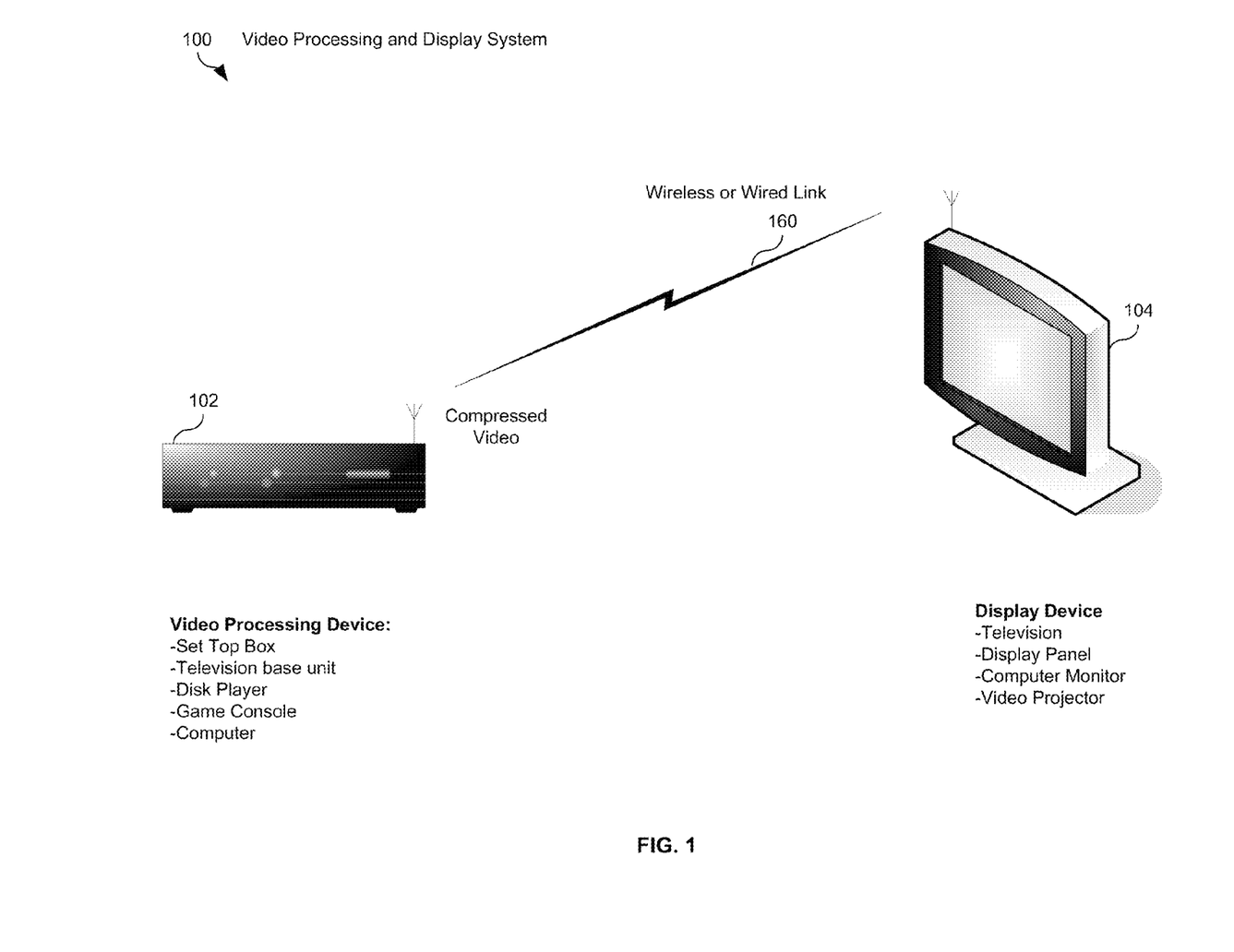
FIG. 1 is a block diagram illustrating an exemplary video processing device that is operable to select a video stream from a plurality of compressed video streams that comprise different compressed versions of a sample of video data, in accordance with an embodiment of the invention.

FIG. 1 is a block diagram illustrating an exemplary video processing device that is operable to select a video stream from a plurality of compressed video streams that comprise different compressed versions of a sample of video data, in accordance with an embodiment of the invention. Referring to FIG. 1, there is shown a video processing and display system 100 that comprises a video processing device 102, a display device 104 and a wireless link 160.

Although FIG. 1 comprises the wireless link 160 between the video processing device 102 and the display device 104, the invention is not limited in this regard and any suitable wired or wireless communication link may be utilized for transmission of video data from the video processing device 102 to the display device 104 without deviating from the scope of the invention.

The video processing device 102 may comprise suitable logic, circuitry, interfaces and/or code that may be operable to receive video data from a video source and may be operable to generate a plurality of processed video bit streams at a plurality of different bit rates from a portion or a sample of the video data. The video processing device 102 may select for transmission, one of the plurality of processed video bit streams that comprises a preferred video bit rate for communication via the wireless link 160. The video processing device 102 may communicate the selected video bit stream to the display device 104. The processing may comprise compression and/or scaling of the video data. For example, a video compressor in the video processing device 102 may compress incoming video to a plurality of video bit rates and may select a video data rate, from the plurality of video data rates, for transmission. The video data in each bit stream may comprise video content and/or may comprise control information. The control information may be utilized by the display device 104 for determining how to decompress and/or scale the video content. The video data may be referred to as video and/or as video information, for example. The video bit stream may be referred to as a video stream or a bit stream, for example. The video processing device 102 may comprise, for example, a set top box (STB), a television base unit, a disk player such as a DVD or Blu-ray disk player, a portable media player, a cell phone, a game console, and/or a computer. In an exemplary embodiment of the invention, the video processing device 102 may be operable to generate two bit streams, one at a higher data rate and one at a lower data rate, however, the invention is not limited in this regard. For example, the video processing device 102 may be operable to generate greater than two bit streams that comprise greater than two bit rates.

The video processing device 102 may be operable to dynamically change a bit rate that is currently utilized to transmit video data to the display device 104, by selecting a video stream that is compressed with a higher or lower bit rate. In this manner, the video processing device 102 may respond to dynamically variable operating conditions in the communication system 100. One or more bit rates may be determined for each frame, for each portion of a frame and/or for a plurality of frames as conditions change in the communication link 160. A bit rate for one or both video bit streams may be adjusted dynamically over time. In an exemplary embodiment of the invention, the video processor 102 may detect that previously transmitted video samples were not received correctly by the display device 104. The video processor 102 may respond to the error by re-transmitting the same video samples compressed to produce a different data rate. For example, the video processor 102 may select a different version of the same video sample from a plurality of differently compressed versions of the same video sample. The different versions may be compressed at different rates, compressed data formats and/or by different compression schemes. For example, the video processor 102 may select a version of the same video sample that is compressed to a data rate that is less than or equal to a rate that will provide reliable communication to the display device 104. Selecting a lower rate in some situations may result in improved video image quality.

The video processing device 102 may utilize a plurality of video compression methods to produce the plurality of video bit streams at different bit rates. A compression method may be referred to as a compression scheme or a compression function. In an exemplary embodiment of the invention, a DPCM based compression method may be utilized for compressing video samples at one data rate and a transform based compression method may be utilized for another version of the same video samples that are compressed at a different bit rate.

The video processing device 102 may be operable to utilize a plurality of compressed bit formats to produce the plurality of video bit streams at the plurality of video bit rates. For example, a different number of bits per pixel may be utilized in different compressed versions of the same video sample. Also, the video processing device 102 may be operable to utilize a plurality of scaling factors to produce different bit rates in the plurality of video bit streams, for example, by varying a number of pixels per frame in different versions of the same video sample.

The display device 104 may be operable to receive the selected video bit streams and may adapt to the changing bit rates and changing compression or scaling methods selected by the video processing device 102. On the received video bit streams, the display device 104 may be operable to perform inverse compression and/or scaling operations relative to the compression and/or scaling operations performed by the video processing device 102.

The video processing device 102 and/or the display device 104, may be operable to determine an appropriate transmission bit rate for wireless transmissions via the wireless link 160. The appropriate transmission bit rate may comprise a bit rate that can be supported on the wireless link and may be referred to as an available bit rate. The available transmission bit rate may be determined based on performance quality or on successfulness of prior wireless communication via the wireless link 160. For example, the video processing device 102 may be operable to receive information from the display device 104 about video image quality and/or success or failure of prior wireless communication. Moreover, the video processing device 102 may be operable to select an appropriate transmission bit rate for communication via the wireless link 160 for other reasons, for example, to save energy or to allocate bandwidth to communication of other information. A bit rate that is determined to be available for transmission via the wireless link 160 and/or is utilized for transmitting video data via the wireless link 160 to the display device 104, may be referred to as a transmission bit rate and/or data rate, a wireless transmission bit rate and/or data rate and a throughput bit rate and/or data rate and may be expressed in bits per second (bps).

The video processing device 102 may be operable to store one or more versions of a video sample that are compressed at one or more bit rates, in order to provide a selection of the video sample at higher and/or lower transmission bit rates. For example, there may be two or more video bit streams comprising the same video content available for transmission at the same instant of time. The video processing device 102 may be operable to adjust bit rates of one or more of the available video bit streams depending on conditions in the wireless link 160 and/or for other reasons such as energy consumption or link congestion. The video processing device 102 may raise or lower bit rates by changing one or more of compression and/or scaling functions, compression parameters, for example, quantization parameters, frame or picture size, for example, represented in pixels per frame, frame rate in frames per second (fps), a color space and/or a chroma sub-sampling function. The words frame, picture and image may be utilized interchangeably to refer to a frame, a field, for example, a top or bottom interlaced field, a progressive frame, a picture or an image, for example.

The display device 104 may comprise suitable logic, circuitry, interfaces and/or code that may be operable to receive wireless video signals from the video processing device 102 that comprise the dynamically selected and changing bit rates. The display device 104 may be operable to process the received video data in accordance with the dynamically selected processing functions performed by the video processing device 102. For example, the display device 104 may be operable to adapt to changing decompression functions, compressed bits format, scaling factor, frame rate and/or color space. The display device 104 may be operable to decompress and/or scale video bit streams and may display the video on a screen. The display device 104 may comprise one or more of a television, a display panel, a computer monitor and/or a video projector, for example.

The wireless link 160 may be operable to carry video data between the video processing device 102 and the display device 104. The video processing device 102 and/or the display device 104 may be operable to communicate via the wireless link 160 based on any suitable standard and/or non-standard wireless technology. For example, the video data may be communicated by the video processing device 102 utilizing Bluetooth, WLAN, WiFi, cellular, WiMAX, Zigbee and/or IR wireless technology. Furthermore, in various embodiments of the invention, the video processing device 102 and the display device may be operable to communicate the video data via a wired link. The wireless link 160 may comprise variable and/or unpredictable operating conditions that may affect which transmission bit rate may reliably communicate the video data. For example, video signals transmitted via the wireless link 160 may undergo dynamic fading, multi-path delay, attenuation from antenna misalignment or signal blocking, noise and/or electromagnetic interference, for example, which may cause the capacity of wireless link 160, with regard to a data throughput rate or an effective bandwidth, to be reduced at times and/or to increase at other times. Also, network congestion and/or near/far receiver issues may affect the available data throughput rate. In this regard, a transmission bit rate on the wireless link 160 that may be determined to be effective in supporting a preferred video image quality on the display device 104, may change over time.

Compressed video that may be communicated via the wireless link 160 may be sensitive to data losses and/or to errors that may be incurred during wireless transmission. In some instances, the video processing device 102 may be operable to transmit the video information at a rate that is lower than its maximum capability in order to obtain a sufficiently low bit error rate (BER) and/or packet error rate (PER). For example, a lower bit rate may enable sufficient error correction functions to obtain a suitably low net BER or PER.

In operation, the video processing device 102 may receive video data from any suitable source, for example, a satellite or cable network or it may receive video data from a storage device such as a DVD, Blu-ray disk and/or memory drive. The video processing device 102 may be operable to process the video and may reliably deliver the video to the display device 104 via the wireless link 160. Operating conditions on the wireless link 160, for example, throughput capacity of the wireless link 160, may vary over time and may vary unpredictably. Bit rates utilized for wireless transmission of the video may vary dynamically in response to the varying operating conditions on the wireless link 160 or elsewhere in the video processing and display system 100. The video processor 102 may compress incoming video to a plurality of video bit rates and may generate a plurality of video data streams accordingly. The video processor 102 may select a compressed video data stream that may comprise a desired bit rate or may select uncompressed video for transmission via the wireless link 160. The video processor 102 and/or the display 104 may detect that previously transmitted data that may comprise one or more video samples, was not received correctly. The video processor 102 may respond by transmitting compressed video data that are representative of the same video samples, which have been compressed to a different bit rate. The video processor 102 may perform the second transmission of the same video samples by selecting from a plurality of compressed versions of the same video samples. The video processor 102 may select a version of compressed data that comprises a data rate that is less than or equal to a rate at which it has been determined that the video data could reliably be conveyed.

The video processor 102 may be operable to select a plurality of bit streams comprising different video content and may be operable to concurrently transmit a plurality of different bit streams to the display device 104. In an exemplary embodiment of the invention, the video processor 102 may communicate two different streams, one comprising a high bit rate, for example, high definition video and a second stream may comprise a low bit rate video stream, for example, a graphic pop up window. As conditions change on the wireless link 160, the bit rates of one or both of the video bit streams may be adjusted by selecting new bit streams comprising adjusted bit rates.

The video processing device 102 may also adjust one or more of its current or future, plurality of video bit rates. For example, one or more of frame size, compression scheme, compressed video bits per pixel format, a frame rate, a color space and/or chroma sampling, may vary dynamically over time in one or more compressed version of a video sample in response to varying operating conditions and/or other factors, such as, the type of video data that is being processed. Various compression schemes for example, DPCM and transform coding, may be utilized by the video processing device 102 to reduce the number of bits per pixel dynamically, and thus, reduce the transmission bit rate dynamically. The transmission bit rate comprises the number of bits per second (bps) that may be utilized to wirelessly communicate compressed or uncompressed video information to the display device 104. In various embodiments of the invention, the video processing device 102 may be operable to provide reliable and good quality video transmission when a throughput capability of the wireless link 160 is low, and reliable, very high quality video transmission when a throughput capability of the wireless link 160 is high.

In an exemplary embodiment of the invention, in instances when only a fraction of a maximum bit rate can be transmitted reliably via the wireless link 160, for example, only 25% of a determined maximum bit rate, various factors such as compression function, modulation technique and/or forward error correction (FEC) scheme may be selected such that only the reliable fraction of the maximum data rate is transmitted. Transmitting at the lower data rate reliably, may prevent wasting of transmission bandwidth on unreliable transmissions at a higher rate data. By selecting the compression function according to operating conditions and/or to types of video information being transmitted, latency and/or overall subjective quality of the displayed video in the display device 104, may be improved. (The compression function may be referred to as a compression scheme.)

Figure 2:
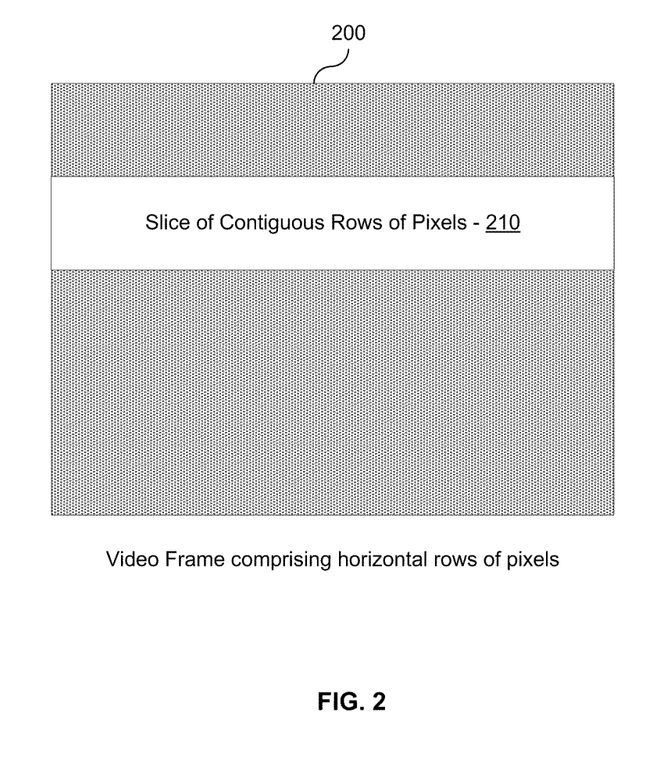
FIG. 2 is a block diagram illustrating an exemplary video frame comprising one or more portions of the video frame, in accordance with an embodiment of the invention.

FIG. 2 is a block diagram illustrating an exemplary video frame comprising one or more portions of the video frame, in accordance with an embodiment of the invention. Referring to FIG. 2, there is shown a video frame 200 that may comprise one or more portions of the video frame such as a slice of pixels 210.

The video frame 200 may comprise a number of horizontal rows of pixels comprising a specified length, depending on frame size. The video frame 200 may comprise any suitable video and/or graphics picture, for example, the video frame 200 may comprise a top or bottom field of interlaced video or a progressive video frame for example. The size of the video frame 200 may indicate the number of pixels per frame and may be referred to as resolution or video picture size, for example. Scaling of the video frame 200 may increase or decrease the number of pixels in the frame, and thus, may change the resolution. Exemplary frame parameters for the video frame 200 may comprise a resolution or frame size of 1920×1080, with a data format comprising 10 bits per sample in a red, green, blue (RGB) color space which may yield a data format comprising 30 bits per pixel. The exemplary video frame 200 may be wirelessly transmitted to the display device 104 at a frame rate of 60 frames per second (fps), for example. As wireless transmission bit rates are dynamically selected over time, a wide variety of frame parameters may be adjusted accordingly. In various embodiments of the invention, adjustments in transmission bit rate may be made on a sub-frame basis, for example, adjustments may occur that affect only a portion of a frame. A portion of the video frame 200 may be referred to as a slice. An exemplary slice 210, may comprise a number of contiguous horizontal rows of pixels, for example, 8 or 16 rows, however, the invention is not limited in this regard. In this regard, the horizontal rows of pixels in the slice of pixels 210, may or may not span the full width of the video frame 200. For example, the slice of pixels 210 may comprise a 16×16 macro block of pixels. The frame 200 may comprise a plurality of slices and a decision regarding transmission bit rate may be made for each slice.

In operation, the video processing device 102, described with respect to FIG. 1, may be operable to make decisions regarding available wireless transmission bit rates on a slice by slice basis. The video processing device 102 may be operable to concurrently generate a plurality of compressed video bit streams comprising the same video content at a plurality of different bit rates. The video processing device 102 may be operable to adjust one or more of compression scheme, compressed bits per pixel format, scale factor, color space and/or chroma sub-sampling in one or more of the plurality of video bit streams in order to reliably transmit the frame 200 to the display device 104. For example, the frame parameters may be adjusted in one or more of the plurality of video bit streams on a per frame basis, a per slice basis and/or on a per multiple frames basis.

Figure 3:
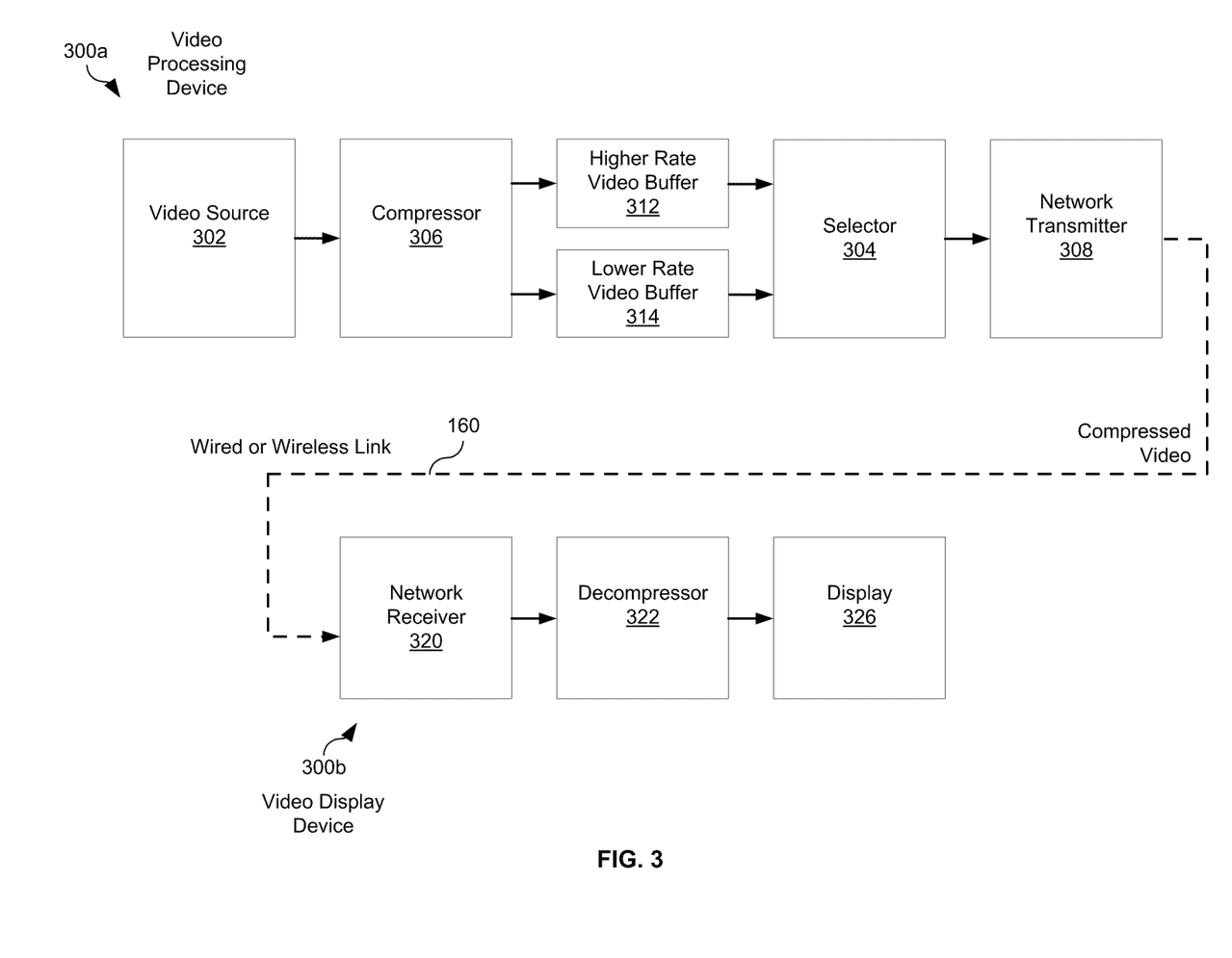
FIG. 3 is a block diagram illustrating an exemplary video processing device that is operable to dynamically select a compressed portion of video data and transmit the selected data to a display device that is operable to dynamically adjust decompression methods, in accordance with an embodiment of the invention.

FIG. 3 is a block diagram illustrating an exemplary video processing device that is operable to dynamically select a compressed portion of video data and transmit the selected data to a display device that is operable to dynamically adjust decompression methods, in accordance with an embodiment of the invention. Referring to FIG. 3, there is shown a video processing device 300a that comprises a video source 302, a compressor 306, a higher rate buffer 312, a lower rate buffer 314, a selector 304 and a network transmitter 308. In addition, there is shown a display device 300b, that comprises a network receiver 320, a decompressor 322 and a display 236. The wireless link 160 is also shown.

The video processing device 300a may be similar and/or substantially the same as the video processing device 102. The display device 300b may be similar and/or substantially the same as the display device 104. The wireless link 160 is described with respect to FIG. 1. Although a wireless link is illustrated between the video processing device 300a and the display device 300b, the invention is not limited in this regard and any suitable wired or wireless link may be utilized between the devices for communication described for the wireless link 160, without deviating from the scope of the invention. The video processing device 300a, the display device 300b and the wireless link 160 may comprise the video processing and display system 100.

The video source 302 may comprise suitable logic, circuitry, interfaces and/or code that may be operable to generate video that comprises a specified video picture size, a data format and/or frame rate. For example, the video source may generate video frames comprising a video picture size of 1920×1080 pixels, with a data format comprising 10 bits per sample RGB and 30 bits per pixel, and a frame rate of 60 frames per second. However, the invention is not limited in this regard and any suitable video picture size, data format and/or frame rate may be utilized. The generated video may be communicated to the display processor 304 and/or to the compressor 306.

The compressor 306 may comprise suitable logic, circuitry, interfaces and/or code that may be operable to receive video from the video source 302 and compress a plurality of versions of the video according to a plurality of specified compression schemes and specified compressed data formats, each comprising a specified number of bits per pixel.

For each compressed version of the received video, the compressor 306 may be operable to dynamically change a compression scheme and/or to dynamically change a compressed data format to enable wireless transmission at variable transmission bit rates. Exemplary compression schemes may comprise transform coding such as H.264 and/or MPEG 4, Advanced Video Coding (AVC), or coding such as DPCM, that may be compliant with JPEG-LS standards, for example, and/or discrete cosign transform (DCT) coding, for example. U.S. patent application Ser. No. 12/720,273, filed on Mar. 9, 2010, entitled "Lossless and Near-Lossless Image Compression," which is incorporated herein by reference in its entirety, provides an exemplary DPCM coding scheme that may be utilized by the compressor 306. In various embodiments of the invention, DPCM may be utilized for transmission at a higher bit rate concurrently when transform coding may be utilized to generate a compressed video bit stream at a lower bit rate, however, the invention is not limited in this regard.

The compressor 306 may comprise a plurality of outputs and may comprise suitable logic, circuitry, interfaces and/or code that may be operable to concurrently compress a sample of video data from the video source 302 to a plurality of versions of compressed and/or scaled formats at a plurality of bit rates. The plurality of versions may be communicated via the plurality of outputs. Each output of the compressor 306 may be referred to as a video bit stream, a video stream or a stream. Each video stream output from the compressor 306 may be communicated to a different buffer such as, for example, to the higher rate buffer 312 and/or the lower rate buffer 314. The higher rate buffer 312 and the lower rate buffer 314 may be logically and/or physically distinct. For example, the buffers may be logically distinct without being physically distinct. Each bit rate of each video bit stream may be changed dynamically. In this regard, the compressor 306 may be operable to dynamically reduce and/or to increase, the number of bits that are utilized to represent a pixel in each video bit stream. The number of bits per pixel may be changed dynamically, as needed, to adjust a transmission bit rate. In various exemplary embodiments of the invention, the compressor 306 may also comprise suitable logic, circuitry, interfaces and/or code that may be operable to scale a video picture in order to change its size and/or resolution. In various embodiments of the invention, the compressor 306 may generate two compressed and/or scaled video bit streams at two different bit rates and may communicate the compressed and/or scaled video bit streams to the higher rate buffer 312 and/or the lower rate buffer 314.

In various embodiments of the invention, one or more compression/decompression schemes that may be utilized by the compressor 306 and the decompressor 322, may not comprise inter-frame prediction, which may be referred to as temporal prediction. For example, the decompressor 322 may not predict pixel values in a frame in a received compressed video bit stream, based on pixels in neighboring frames. Notwithstanding, in various embodiments of the invention, for example, when transform coding such as AVC is utilized, the decompressor 322 may utilize intra-frame prediction which may be referred to as spatial prediction. With spatial prediction, the decompressor 322 may predict pixel values in a frame utilizing other reconstructed pixels from the same frame.

The selector 304 may comprise suitable logic, circuitry, interfaces and/or code that may be operable to select one of the plurality of video bit streams for transmission to the display device 104 via the network transmitter 308. The selector 304 may be operable to respond to control information received from the network transmitter 308. For example, the network transmitter 308 may be operable to indicate to the selector 304 which bit rate may be supported by the wireless link 160 and the selector 304 may choose a video bit stream accordingly. The selector 304 may be operable to change its selection while the network transmitter 308 is transmitting a video bit stream, for example, when the network transmitter 308 may indicate that a different compressed video rate should be selected.

The network transmitter 308 may comprise suitable logic, circuitry, interfaces and/or code that may be operable to receive a compressed video bit stream from the selector 304 and to transmit the video bit stream via the wireless link 160 to the network receiver 320 in the video display device 300*b*. The network transmitter 308 may be operable to transmit other information such as control information, concurrently with the compressed video bit stream. Moreover, the network transmitter 308 and/or the network receiver 320 may be operable to dynamically determine an available transmission data rate at which a video bit stream or a portion of the video bit stream may be reliably communicated. A new available transmission data rate may be determined repeatedly for one or more video frames and/or for one or more portions of a video frame. For example, an available transmission data rate may be determined for each slice of a video frame. The determined available transmission bit rate may change dynamically during transmission of a video bit stream. New transmission data rates may be determined based on network performance before, during or after transmission of a video bit stream.

The network transmitter 308 may be operable to detect that a packet or frame comprising a portion of video data that has been transmitted was not received correctly by the display device 104. As a result, the network transmitter 308 may request that the selector 304 select another video bit stream comprising the same portion of video data that utilizes either the same video data rate or a different video data rate. This operation may be referred to as re-transmission.

In various embodiments of the invention, the network transmitter 308 may be operable to request, via the selector 304, a bit rate that is lower than a first rate that is available from the lower rate buffer 314 and greater than a second rate that is available from higher rate buffer 312. The selector 304 may be operable to select a video bit stream from the lower rate buffer 314 in order to ensure that the transmitter 308 may transmit it in a timely fashion. The transmitter 308 may be operable to indicate to the compressor 306, which compressed video data rate it would prefer to transmit. The compressor 306 may be operable to respond by compressing future portions of video data at the requested rate as one of its plurality of compressed video data rates.

The network receiver 320 in the display device 300*b* may comprise suitable logic, circuitry, interfaces and/or code that may be operable to wirelessly receive the compressed video bit stream from the network transmitter 308 and may communicate the compressed video bit stream to the decompressor 322. The display device 300*b* may be operable to wirelessly communicate information to the video processing device 102 via the wireless link 160 that may enable dynamic determination of available transmission data rates. Alternatively, the display device 300*b* may be operable to dynamically determine and transmit an available transmission data rate to the video processing device 102 to enable communication of video data via the wireless link 160. For example, the network receiver 320 may be operable to detect errors and/or measure performance of a received compressed video bit stream. The detected errors and/or link performance may be utilized to determine an available transmission data rate. The display device 300*b* may communicate or may utilize, for example, bit error rate, packet error rate and/or signal to noise ratio measurements for the dynamic determination of an available transmission data rate. In some embodiments of the invention, the network receiver 320 may also be operable to request a re-transmission of one or more packets from the network transmitter 308, and may deliver received retransmitted packets of data to the decompressor 322.

The network receiver 320 and/or the decompressor 322 may be operable to store received video pictures. The stored video pictures may be utilized in instances when there is a failure in decoding a subsequently received video picture. In this regard, the stored video picture or a portion of the video picture may be displayed in place of an impaired or missing subsequent video picture or portion of a subsequent video picture. In some instances, the video data that is displayed from storage may not exhibit serious visual artifacts whereas utilization of the impaired video picture may cause serious visual artifacts to appear.

The decompressor 322 may comprise suitable logic, circuitry, interfaces and/or code that may be operable to receive a compressed video bit stream from the network receiver 320 and may be operable to perform functions on the video data that are inverse functions with respect to functions performed on the video data by the compressor 306. For example, in instances when the compressor 306 scales the video to a different size, the decompressor may scale it back to its original size. Alternatively, the decompressor may scale the video to a different size, for example, according to specifications determined for the display device 300b. The decompressor 322 may be operable to decompress the compressed video bit stream to an increased bit per pixel format. The decompression and/or scaling functions performed by the decompressor 322 may change dynamically over time as the transmission bit rate from the video processor 300a changes. The decompressed video bit stream output from the decompressor 322 may be sent to the display 326.

The display device 300b may comprise suitable logic, circuitry, interfaces and/or code that may be operable to process a decompressed video bit stream by, for example, one or more of scaling, sharpening, adjusting the color space and/or by compensating for attributes of the display 326. U.S. patent application Ser. No. 12/770,524 filed on Apr. 29, 2010 and incorporated herein by reference in its entirety, provides additional information regarding processing a decompressed video bit stream.

The display 326 may comprise suitable logic, circuitry, interfaces and/or code that may be operable to receive a decompressed video bit stream from the decompressor 322 and may display received video frames at a specified frame rate. The display 326 may comprise any suitable display screen technology such as, for example, a liquid crystal display or plasma display.

In operation, the video source 302 may be operable to generate video data and may communicate the video data to the compressor 306. The compressor 306 may be operable to compress a portion or a sample of the video data into a plurality of video bit streams, where each bit stream may be compressed and/or scaled differently. Each of the plurality of video bit streams may incur various degrees of loss of image fidelity; or may comprise lossless compression and preserve image fidelity. In various video bit streams, the compressor 306 may not compress the video at all. The plurality of video bit streams generated by the compressor 306 may comprise the same video content and may comprise control information. The plurality of video bit streams may be stored in a plurality of buffers, for example, the lower rate buffer 312 and/or the higher rate buffer 314. A stored video bit stream may be selected and may be communicated to the network transmitter 308. Control information in the selected and/or transmitted video bit stream may be utilized by the decompressor 322, for example, to determine which functions the compressor 306 may have utilized when processing the selected video bit stream. The functions may comprise, for example, a compression scheme, a compressed data format and/or a scaling factor. In this manner, the decompressor 322 may perform an inverse of the functions that were performed by the compressor 306 on the selected video bit stream.

The selector 304 may choose a video bit stream on a slice by slice basis or, on a frame by frame basis, for example. The network transmitter 308 may communicate to the network receiver 320, which rate is being utilized and/or may communicate other information for decompressing, scaling and/or processing the video data.

The compressor 306 may be operable to change compression functions and/or parameters for one or more of the plurality of video bit streams in accordance with dynamically changing control information received from the network transmitter 308. In various embodiments of the invention, the compressor 306 may be operable to scale the video data. The compressor 306 may repeatedly receive requests from the network transmitter 308, for dynamically variable and/or unpredictable transmission bit rates. The transmission bit rates may be determined based on how much data throughput the video processing and display system 100 and/or the wireless link 160 may be capable of supporting at a specified time and/or for a specified video image quality, for example. The compressor 306 may be operable to change various compression and/or scaling parameters in one or more of the plurality of video bit streams such that an appropriate bit rate may be available for selection as needed. The compressor 306 may notify the transmitter 308 when the changes are implemented. In this manner, the video processing device 300a may provide flexibility in responding to variable network conditions.

In various instances when an available throughput rate for transmission, via the wireless link 160, falls to a lower level, the compressor 306 may reduce the number of compressed bits per pixel in one or more of the plurality of video bit streams to accommodate the lower available throughput rate. In instances when the available throughput rate drops to a level that may impair a perceived video image quality, the compressor 306 may be operable to scale a frame to a smaller size and may or may not reduce or increase the bits per pixel of the scaled frame. The smaller size frame may reduce the resolution of a reconstructed frame in the display device 300b but may enable reliable transmission and may provide a better subjective image quality or user experience. For example, for a 1920×1080, high definition video frame size, the number of bits per pixel may range from approximately 15 to 2. At approximately 3 or 4 bits per pixel, artifacts may be perceived by a viewer. Rather than lowering the bits per pixel, the compressor 306 may first scale frame size, for example, to 1280×720 or to 960×540. This scaling may enable the compressor 306 to utilize a greater number of bits per pixel. The loss of resolution due to scaling may be subjectively preferable to a viewer than the artifacts perceived at very low bit per pixel rates. The scaling may be performed dynamically for each video bit stream, for example, on a frame by frame basis or on a slice by slice basis, for example. In this regard, a decision could be made on each frame or on each slice of a specified size in a video bit stream as to whether one or both of the bits per pixel and the pixels per frame should be increased and/or decreased.

The decompressor 322 may be operable to decompress each slice of a video frame according to its dynamically selected compressed data format and/or image scale factor. For example, in instances when the decompressor 322 receives a plurality of video frame slices that are compressed with DPCM at 15 bits per pixel followed by a plurality of frame slices that are compressed with transform coding at 4 bits per pixel, the decompressor 322 may decode each slice appropriately and may reconstruct the frame with the decoded slices. The display device 300b may be operable to perform additional video processing such as filtering, sharpening, color space conversion and/or graphics application. The decompressed and/or processed video data may be communicated to the display 326. The display 326 may be operable to illuminate the decompressed pixels on a display screen.

In various exemplary embodiments of the invention, the video processing device 300a may comprise suitable logic, circuitry, interfaces and/or code that may be operable to receive a plurality of different sets of video data from one or more video sources such as the video source 302. One or more compressors such as the compressor 306 may be operable to compress each of the received sets of source video data into a plurality of video bit streams comprising a plurality of bit rates. For example, the video processing device 300a may be operable to utilize one or more different compression functions, compressed video formats, frame scale factors, color spaces and/or chroma sampling rates to produce a plurality of video bit streams for each set of video source data, comprising different bit rates for each set of video source data. The plurality of video bit streams for each set of video source data may be stored in a plurality of buffers, which may be similar to the higher rate buffer 312 and/or the lower rate buffer 314. One or more selectors such as the selector 304 may select a video bit stream for each video source. For example, the one or more selectors may be operable to select a video bit stream comprising high bit rate, high definition video content and a second stream that may comprise a low bit rate video stream, for example, a graphic pop up window.

The network transmitter 308 may be operable to concurrently transmit the plurality of bit streams to the display device 300b via the wireless link 160. As conditions change on the wireless link 160, the bit rates of one or more of the video bit streams may be adjusted by selecting new bit streams comprising adjusted bit rates. The display device 300b may comprise suitable logic circuitry, interfaces and/or code that may be operable to receive the plurality of bit streams and dynamically change one or more of compression functions, compressed video formats, frame scale factors, color spaces and/or chroma sampling to decompress the plurality of video bit streams appropriately. The display device 300b may send the plurality of bit streams to the display 326. In instances when an available transmission rate may fall below a rate utilized by the higher rate bit stream, the higher rate encoding may be adjusted to match or to approximately match the new available transmission bit rate. There may be as few as two concurrent bit streams that may provide a wide range of transmission bit rates while maintaining high quality images.

Figure 4:
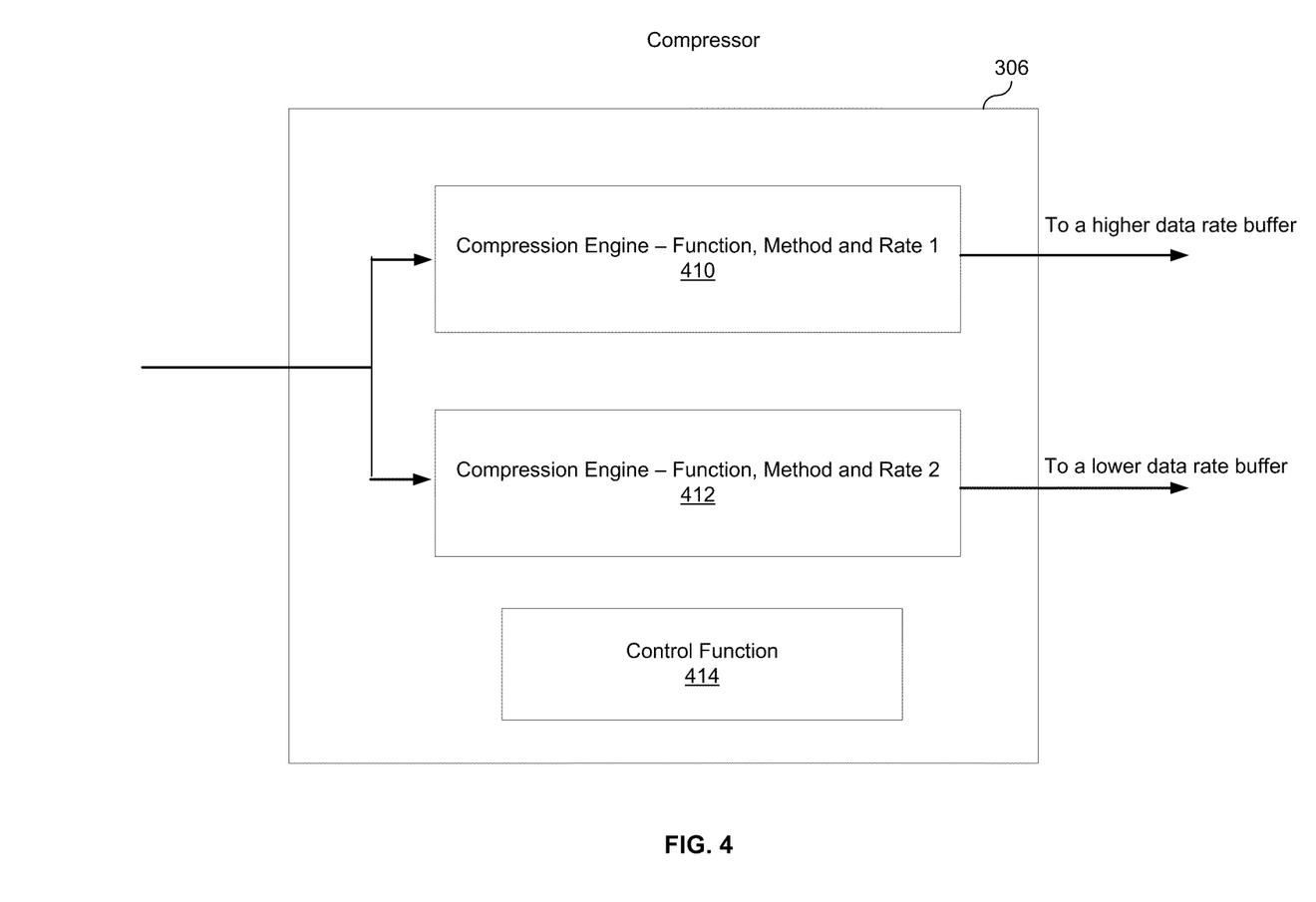
FIG. 4 is a block diagram illustrating an exemplary compressor that is operable to generate a plurality of video bit streams with different bit rates, different compression functions and/or different compression formats, in accordance with an embodiment of the invention.

FIG. 4 is a block diagram illustrating an exemplary compressor that is operable to generate a plurality of video bit streams with different bit rates, different compression functions and/or different compression formats, in accordance with an embodiment of the invention. Referring to FIG. 4, there is shown, the compressor 306 which comprises a compression engine—function, method and rate one 410, a compression engine—function, method and rate two 412, and a control function 414. Various aspects of the compressor 306 are described with respect to FIG. 3.

The control function 414 may comprise suitable logic, circuitry, interfaces and/or code that may be operable to receive information from the network transmitter 308. The received information may provide an indication of an available transmission data rate at which the network transmitter 308 can presently support transmission of a video bit stream via the wireless link 160 to the display device 300b. The available transmission data rate may change dynamically and new transmission data rate values may be communicated to the control function 414 repeatedly over time. The control function 414 may determine one or more transmission data rates based on the received information, for one or both of the compression engine—function, method and rate one (CE-1) 410 and the compression engine—function, method and rate two (CE-2) 412. In accordance with one or more of the determined transmission bit rates, the control function 414 may communicate to the CE-1 410 and/or the CE-2 412, various compression functions and/or parameters for implementing a specified transmission data rate. For example, the control function 414 may communicate transmission data rates, compressed bit formats, compression functions, color spaces and/or chroma sub-sampling rate information to the CE-1 410 and/or the CE-2 412. The communicated compression functions and/or parameters may vary dynamically, for example, in response to the varying available transmission data rate as reported by the network transmitter 308. The CE-1 410 and/or the CE-2 412 may each adjust their compression rates and/or their methods in response to the information from the control function 414. The information from the control function 414 may apply to a frame, a plurality of frames and/or a portion of a frame, such as a slice of contiguous pixel rows.

The compressor 306 may comprise a plurality of compression engines, for example, the CE-1 410 and/or the CE-2 412. The CE-1 410 and/or the CE-2 412 may each comprise suitable logic, circuitry, interfaces and/or code that may be operable to compress incoming video to two or more transmission data rates concurrently. The methods used to compress video data to the plurality of data rates may differ or may be the same. The compressor 306 may be operable to compress scaled or un-scaled video data. The CE-1 410 and/or the CE-2 412 may each be operable to utilize any suitable compression function or compression scheme as described with respect to FIG. 3, for example. The CE-1 410 and/or the CE-2 412 may each be operable to handle any suitable frame size, compressed data format, frame rate, color space and/or chroma sub-sampling. In various embodiments of the invention, the CE-1 410 and/or the CE-2 412 may utilize the compression function disclosed in U.S. patent application Ser. No. 12/720,273, filed on Mar. 9, 2010, entitled "Lossless and Near-Lossless Image Compression," however; the invention is not limited with regard to which compression function is utilized. The CE-1 410 and/or the CE-2 412 may be operable to dynamically convert a data format and/or a number of bits per pixel in a frame of video data or a portion of a frame of video data, to a different data format and/or a different number of bits per pixel. The CE-1 410 and/or the CE-2 412 may be operable to change data format and/or the number of bits per pixel on a slice by slice basis, a frame by frame basis or for a plurality of frames, notwithstanding, the invention is not limited in this regard.

The compressor 306 may facilitate the selection between the plurality of compressed data rates by organizing image data into slices. For example, a slice may comprise of a set of image pixels that cover a contiguous set of horizontal lines of pixels, for example 8 lines. Alternatively, a slice may comprise a set of image pixels that cover a contiguous set of partial horizontal lines that span only a portion of the width of the entire image, such that a plurality of slices may span the width of the image. The compressed video bit streams output from the CE-1 410 and/or the CE-2 412 may be constructed in such a way that it is possible to decode a whole slice, starting at the beginning of the slice, without having decoded a previous slice that may be encoded using the same compressed data format. In various instances, it may not be practical to decode a portion of a slice, starting at a point other than the beginning of the slice. Therefore, the same slice definition may be utilized for the plurality of transmission data rates and the plurality of compression engines, such as the CE-1 410 and/or the CE-2 412.

During re-transmission of a slice of video data, where a slice was previously transmitted using a first compressed data rate and failed, the network transmitter 308 may communicate an indication to the selector 304 that the selector 304 should provide a compressed version of the slice at a second compressed data rate. The selector 304 may access the same slice of video data that is encoded at the second rate, from an appropriate buffer, for example, from one of the higher rate buffer 312 or the lower rate buffer 314. The resulting bit stream may be decoded by the decompressor 322 in the display device 300b.

Slices may be organized such that a plurality of slices at one compressed data rate may correspond to a smaller number of slices at a second compressed data rate, where both sets of slices correspond to the same set of image samples. For example, a plurality of slices at a lower data rate may comprise video content that corresponds to video content in one slice at a higher data rate.

In various embodiments of the invention, one slice may correspond to one network transmission packet. In this regard, in instances when one network packet is lost, only one slice may need to be re-transmitted, for example, at the same or at different compressed data rates. The data rate utilized may enable the receiver 320 and decompressor 322 to receive and decode compressed video data to produce a suitable quality image.

The compressor 306 may be operable to provide information in its output data stream that may indicate which scaling factor, data format, bits per pixel rate and/or compression functions were performed on a corresponding input data stream or subsequent input data stream. In this manner, the network receiver 320 and the decompressor 322 may perform inverse functions on the compressor 306 output data stream to reconstruct or recover data corresponding to the compressor 306 input data stream.

In operation, the compressor 306 may be operable to compress incoming video data into two or more video bit streams that comprise the same video content compressed to different data rates. The compressor 306 may comprise a plurality of compression engines, for example, the CE-1 410 and the CE-2 412 that may generate one or more of the compressed video bit streams concurrently. The plurality of compression engines may be operable to utilize one type of compression scheme to generate the plurality of compressed video bit streams at different rates, or may utilize a plurality of compression schemes. For example, in instances when a very high image quality is expected, a differential pulse-code modulation (DPCM) compression scheme may be utilized. Alternatively, in instances when a lower data rate may be preferred, a transform based scheme may be utilized.

The control function 414 may be operable to receive input from the network transmitter 308 which may indicate a data rate at which the network transmitter 308 and/or the network receiver 320 are currently able to support reliable transmissions via the wireless link 160. The control function 414 may be operable to indicate one or more target data rates for transmission of compressed video to one or more of the plurality of compression engines CE-1 410 and/or CE-2 412, for example. The target data rates for each compression engine may vary dynamically, for example in response to varying conditions of the wireless link 160 and/or for varying characteristics of video data to be compressed. In various embodiments of the invention, the control function 414 may be operable to adjust the compression scheme, compressed video format, frames rate, frame size, color space and/or chroma sampling in one or more of the plurality of compression engines, for example, in the CE-1 410 and/or the CE-2 412, in response to variations in the target compressed video data rates. The plurality of compressed video bit streams may be written to a plurality of buffers, for example, to the higher rate buffer 312 and/or to the lower rate buffer 314. The selector 304 may be operable to select a video bit stream from one of the buffers, in accordance with a data rate which the network transmitter 308 and/or the network receiver 320 are currently able to support for reliable transmissions via the wireless link 160. The network transmitter 308 may be operable to transmit the selected video bit stream to the network receiver 320. The decompressor 322 may be operable to decompress the selected bit stream in accordance with the appropriate compression scheme and compressed video data format. The decompressor may be operable to communicate the decompressed video to the display 326.

In an exemplary embodiment of the invention, an original video frame size and data format may be expressed as 1920× 1080p60, RGB30 which may comprise a frame size of 1920× 1080 pixels, a frame rate of 60 frames per second, progressive format frames, and an RGB color space with an original data format comprising 10 bits per color sample or equivalently, 30 bits per pixel. The video scaler 410 may convert the original video frame size to 960×540p60 which may comprise half of the size of the original frame in each dimension, with a frame rate of 60 frames per second. The compression engine 412 may compress the scaled video frame. The compression engine 412 may utilize DPCM coding and may compress to 12 bits per pixel.

In an exemplary embodiment of the invention, in instances when a buffer space budget may permit, the compressor 306 and/or the control function 414 may determine to adjust a video frame rate. For example, one or more 1920×1080p60 frames which may comprise a frame rate of 60 frames per second (fps) may be converted to 1920×1080p30 at 30 fps. Such a conversion may be performed by compressing only every other frame. Conversion to a lower frame rate may necessitate that the compressor 306 and/or the network transmitter 308, comprise a buffer large enough to store compressed bits so that the compressed bits may be transmitted at $\frac{1}{30}$th of a second rather than at $\frac{1}{60}$th of a second. The display device 326 may handle frames that undergo a corresponding frame rate conversion, back to 60 fps, for example. The display device 326 may need a similar buffer to store the decompressed pictures. The display device 326 may display each frame twice to convert the 30 fps video data to 60 fps. Alternatively, the decompressor 322 may decompress each video frame twice to perform the frame rate conversion from 30 to 60 fps and may utilize compressed buffer space to accommodate such a function.

In instances when an available transmission bit rate is sufficiently high the compressor 306 may compress video data such that there is no loss, very little loss or it may not compress it at all. For example, 1920×1080p60 RGB30 video may be compressed with very high quality to 10 bits per pixel. In this example, the resulting transmission data rate, utilizing horizontal and vertical blanking intervals, may be approximately 1.244 Gbps.

The network transmitter 308 may provide an indication of the availability of a transmission data rate that is higher than what the compressor 306 needs for high quality compression and transmission of video. In this regard, the compressor 306 may be operable to decide to transmit video at a lower rate than what is available. The compressor 306 may dynamically determine that it prefers a lower or higher data rate than what is available.

The compressor 306 may determine a preferred data rate that it will utilize based on a desired level of compression for a current video picture. For example, if an optimal data rate for a desired image quality of the current video picture is higher than the rate currently configured, the controller 414 may request a higher data rate. Similarly, if the current video picture needs only a lower data rate for a desired image quality than any of the currently configured data rates, the controller 414 may request a lower data rate, or it may utilize a lower data rate than that which has been allocated. In this manner, dynamic adjustments may be made to the selection of data rates in accordance with a desired level of compression for a video picture. Lower data rates may enable the network transmitter 308 to allocate a portion of network bandwidth to other functions, for example, to non-real-time data transmission.

The CE-1 410 and/or the CE-2 412 may be operable to utilize a scale function to reduce spatial resolution of an incoming video image before compression. Such scaling may facilitate the production of a high quality image after decoding and inversing the scale function.

The compressor 306 may be operable to make different determinations of scaling factor, format conversion and compressed data bits per pixel according to different values of the available data throughput rate indicated by the network transmitter 310. Moreover, the compressor 306 may be operable to make different determinations of scaling factor, format conversion and compressed data bits per pixel in accordance with preferences of the video processing and display system 100 and/or the content of a video picture. For example, in instances when a video picture comprises graphics information, the control function 414 may determine not to convert a video picture formatted in RGB color space to the YUV422 color space, whereas in instances when a video picture does not comprise graphics content, the control function 414 may determine that an RGB formatted video picture should be converted to a YUV422 color space, for example, when the available throughput data rate is low.

The compressor 306 may be operable to scale an input video picture and to generate a reconstructed video picture from the scaled video picture. The reconstructed video picture may be scaled to the original size of the input picture. A difference may be determined between the input video picture and the scaled reconstructed video picture. The difference may be referred to as a residual image. The residual image may be encoded and transmitted via the wireless link 160 along with a compressed version of the scaled video picture. The scaled image and the residual image may be compressed concurrently using a plurality of compression functions, for example CE-1 410 and CE-2 412. The compressed bits representing the residual image may be transmitted with less reliability than the scaled and/or compressed video picture. The decompressor 322 may perform a mirror image of the operations performed by the compressor 306, for example, decompression of the scaled video picture and scaling to the original video picture size. The decompressor 322 may also be operable to decompress and/or scale the residual image. The decompressed and/or scaled residual image may be added to the decompressed and/or re-scaled video picture. In instances when errors are detected in all or a portion of the compressed residual image, corresponding portions of the decompressed residual image may not be added to the decompressed scaled video picture.

Figure 5:
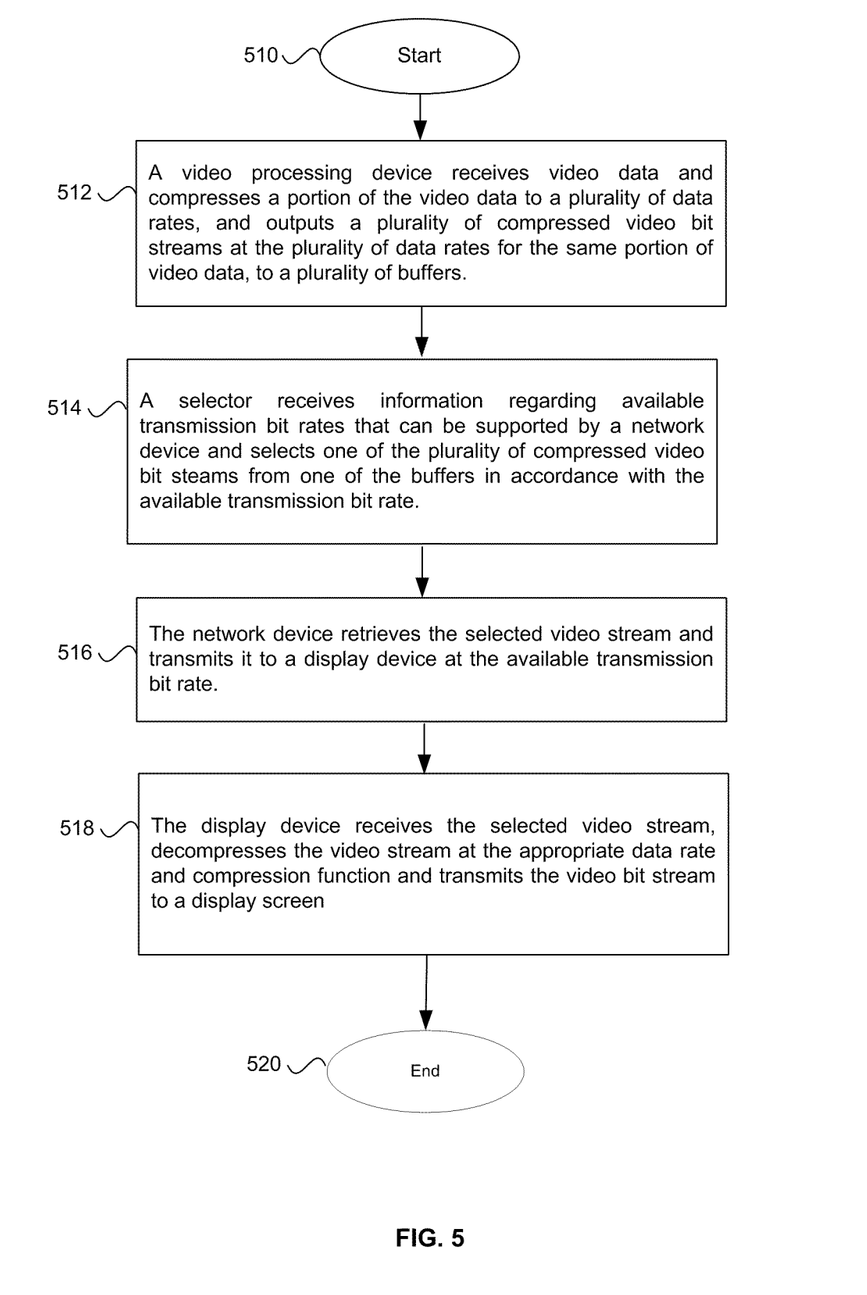
FIG. 5 is a flow chart illustrating exemplary steps for selecting a video stream comprising a specified bit rate and communicating the selected video stream to a display device, in accordance with an embodiment of the invention.

FIG. 5 is a flow chart illustrating exemplary steps for selecting a video stream comprising a specified bit rate and communicating the selected video stream to a display device, in accordance with an embodiment of the invention. Referring to FIG. 5, the exemplary steps may begin with step 510. In step 512, a video processing device 300*a* may receive video data and may compress a portion of the video data to a plurality of data rates, for example, in the compression engine—function, method and rate one (CE-1) 410 and the compression engine—function, method and rate two (CE-2) 412 of the compressor 306. The video processing device 102 may be operable to output a plurality of compressed video bit streams at a plurality of data rates for the same portion of video data. The plurality of output bit streams may be communicated to a plurality of buffers, for example, to the higher rate buffer 312 and the lower rate buffer 314.

In step 514, a selector 304 may be operable to receive information regarding an available transmission bit rate that may be supported by the network transmitter 308. The selector 304 may be operable to select one of the plurality of compressed video bit steams from one of the buffers in accordance with the available transmission bit rate. In step 516, the network transmitter 308 may be operable to retrieve the selected video stream and may transmit the stream to the display device 300*b* at the available transmission bit rate. In step 518, the display device 300*b* may be operable to receive the selected video stream and to decompress the video stream in the decompressor 322 utilizing an appropriate data rate and compression function. The decompressor 322 may be operable to transmit the video bit stream to a display screen, for example, to the display 326. Step 520 may be the end of the exemplary steps.

In an embodiment of the invention, a video processing device 300*a* that is communicatively coupled to a display device 300*b*, for example, via the wireless link 160, may be operable to receive video data from a video source 302. The video processing device 300*a* may generate, from a portion of the video data, a plurality of compressed video bit streams comprising a plurality of different bit rates. For example, the plurality of compressed video bit streams may be compressed by the compression engines CE-1 410 and/or CE-2 412. The plurality of compressed video bit streams may be stored in a plurality of buffers, for example, the higher rate buffer 312 and/or the lower rate buffer 314. One or more of the compressed video bit streams may be dynamically selected and may be transmitted to the display device 300*b*. Two or more of the plurality of compressed video bit streams may be generated concurrently. One or more of the plurality of bit rates may be determined based on one or both of dynamically changing operating conditions and link performance during prior transmissions to the display device 300*b*. Which one or more of the plurality of compressed video bit streams to select, may be determined dynamically in response to information received from one or more communication devices that may be coupled via the wireless link 160 device, for example from the network transmitter 308 and/or the network receiver 320.

The plurality of compressed video bit streams comprising the plurality of different bit rates may be generated utilizing a plurality of compression schemes or a single compression scheme. One or more of the plurality of compressed video bit streams may be generated utilizing one or both of DPCM compression and transform compression. One or more of the plurality of different bit rates may be dynamically adjusted. For example, one or more of the plurality of different bit rates may be dynamically adjusted by adjusting one or more of compression scheme, compressed video bits per pixel format, frame size, frame rate, color space and/or chroma sampling. The portion of the video data that is compressed to generate the plurality of compressed video bit streams may comprise one or more of a plurality of contiguous horizontal rows of pixels, a full frame of pixels and a scaled frame of pixels. Information about the one or more dynamically selected, compressed video bit streams may be communicated to the display device 300*b*, and may be utilized for control of decompression operations performed by the display device 300*b*, for example, in the decompressor 322. The display device 300*b* may receive the one or more selected video bit streams and may determine a decompression function to invert a compression function that was utilized by the video processing device 300*a*. The display device 300*b* may decompress the received video bit streams and may reconstruct the video data from results of the decompression. The display device may provide the reconstructed video data to the display 326. In this manner, a video processing device 300a may be operable to respond to variable and/or unpredictable operating conditions by selecting from a plurality of compressed video bit streams comprising different bit rates.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptive rate video compression and transmission.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, by a video processing device coupled to a display device via a communication link, video data from a video source;
generating, by the video processing device, from a portion of the video data, a plurality of compressed video bit streams each comprising a different bit rate;
selecting, by the video processing device, a first compressed video bit stream of the plurality of compressed video bit streams based on an operating condition associated with the communication link;
communicating, by the video processing device, a first sub-frame of the selected first compressed video bit stream to the display device at a first frame size and a corresponding first number of bits per pixel; and
dynamically adjusting, by the video processing device, the bit rate of the first compressed video bit stream during the communication of the first compressed video bit stream to the display device via the communication link by communicating a second sub-frame of the selected first compressed video bit stream to the display device at a second, smaller frame size and a corresponding second number of bits per pixel, responsive to one or both of a change of the operating condition associated with the communication link and a link performance of the communication link, wherein the ratio of the second number of bits per pixel to the first number of bits per pixel is greater than the ratio of the second, smaller frame size to the first frame size.

2. The method according to claim 1, further comprising dynamically determining which of the compressed video bit streams to select in response to information received from at least one communication device that is communicatively coupled to the video processing device via the communication link.

3. The method according to claim 1, further comprising generating the plurality of compressed video bit streams, utilizing at least one of:
a plurality of compression schemes;
a single compression scheme;
DPCM compression; and
transform compression.

4. The method according to claim 1, wherein dynamically adjusting the bit rate of the first compressed video stream during the communication of the first compressed video stream further comprises dynamically adjusting a compression scheme, compression parameter, frame size, frame rate, color space, chroma sampling, or any combination thereof of the first compressed video stream.

5. The method according to claim 1, wherein the portion of the video data comprises at least one of a plurality of contiguous horizontal rows of pixels, a portion of at least one row of pixels, a full frame of pixels and a scaled frame of pixels.

6. The method according to claim 1, further comprising communicating information about the selected first compressed video bit stream, to the display device, for control of decompression operations performed by the display device.

7. The method according to claim 1, wherein the display device is configured to receive the selected first compressed video bit stream, determine a decompression function to invert a compression function performed by the video processing device, decompress the received first video bit stream, reconstruct the video data from results of the decompression and provide the reconstructed video data to a display.

8. A system for communication, the system comprising:
one or more processors, circuits, or any combination thereof, for use in a video processing device that, during operation, is communicatively coupled to a display device via a communication link, wherein the one or more processors, one or more circuits, or any combination thereof, are configured to:
receive video data from a video source,
generate, from a portion of the video data, a plurality of compressed video bit streams each comprising a different bit rate;
select a first compressed video bit stream of the plurality of compressed video bit streams based on an operating condition associated with the communication link;

communicate a first sub-frame of the selected first compressed video bit stream to the display device at a first frame size and a corresponding first number of bits per pixel; and communicate a second sub-frame of the selected first compressed video bit stream to the display device at a second, smaller frame size and a corresponding second number of bits per pixel, responsive to one or both of a change of the operating condition associated with the communication link and a link performance of the communication link, wherein the ratio of the second number of bits per pixel to the first number of bits per pixel is greater than the ratio of the second, smaller frame size to the first frame size.

9. The system according to claim 8, wherein said one or more processors, one or more circuits, or any combination thereof, are further configured to dynamically determine which of the compressed video bit streams to select in response to information received from at least one communication device that is communicatively coupled to the video processing device via the communication link.

10. The system according to claim 8, wherein said one or more processors, one or more circuits, or any combination thereof, are further configured to generate the plurality of compressed video bit streams, utilizing at least one of:
a plurality of compression schemes;
a single compression scheme;
DPCM compression; or
transform compression.

11. The system according to claim 8, wherein said one or more processors, one or more circuits, or any combination thereof, are further configured to dynamically adjust the bit rate of the first compressed video stream during the communication of the first compressed video stream by dynamically adjusting a compression scheme, compression parameter, frame size, frame rate, color space, chroma sampling, or any combination thereof.

12. The system according to claim 8, wherein the portion of the video data comprises at least one of a plurality of contiguous horizontal rows of pixels, a portion of one or more rows of pixels, a full frame of pixels and a scaled frame of pixels.

13. The system according to claim 8, wherein said one or more processors, one or more circuits, or any combination thereof, are further configured to communicate information about the first compressed video bit stream, to the display device, for control of decompression operations performed by the display device.

14. The system according to claim 8, wherein the display device is further configured to receive the selected first compressed video bit stream, determine a decompression function to invert a compression function performed by the video processing device, decompress the received first video bit stream, reconstruct the video data from results of the decompression and provide the reconstructed video data to a display.

15. The method according to claim 1, comprising communicating a different one of the compressed video bit streams to the display device, responsive to the first compressed video bit stream not being correctly received by the display device.

16. The system according to claim 8, wherein said one or more processors, one or more circuits, or any combination thereof, are further configured to communicate a different one of the compressed video bit streams to the display device, responsive to the first compressed video bit stream not being correctly received by the display device.

17. The method according to claim 1, further comprising concurrently communicating the first compressed video bit stream and a second compressed video bit stream to the display device, while dynamically adjusting the bit rate of the first compressed video stream.

18. The system according to claim 8, wherein said one or more processors, one or more circuits, or any combination thereof, are operable to concurrently communicate the first compressed video bit stream and a second compressed video bit stream to the display device, while dynamically adjusting the bit rate of the first compressed video stream.

19. A non-transitory computer-readable medium embodying a program executable in a video processing device communicatively coupled to a display device via a communication link, the program configured to at least:
receive video data from a video source;
generate, from a portion of the video data, a plurality of compressed video bit streams each comprising a different bit rate;
select a first compressed video bit stream of the plurality of compressed video bit streams based on an operating condition associated with the communication link;
communicate a first sub-frame of the selected first compressed video bit stream to the display device at a first frame size and a corresponding first number of bits per pixel; and
communicate a second sub-frame of the selected first compressed video bit stream to the display device at a second, smaller frame size and a corresponding second number of bits per pixel, responsive to one or both of a change of the operating condition associated with the communication link and a link performance of the communication link, wherein the ratio of the second number of bits per pixel to the first number of bits per pixel is greater than the ratio of the second, smaller frame size to the first frame size.

20. The non-transitory computer-readable medium according to claim 19, wherein the program is further configured to concurrently generate at least two of the plurality of compressed video bit streams.

21. The method according to claim 1, wherein dynamically adjusting the bit rate of the first compressed video stream during the communication of the first compressed video bit stream further comprises dynamically adjusting the bit rate on a per-slice basis within the first compressed video stream.

22. The method according to claim 21, wherein dynamically adjusting the bit rate on a per-slice basis further comprises communicating a first slice of the first compressed video bit stream at a first number of bits per pixel, and communicating a second slice of the first compressed video bit stream at a second number of bits per pixel, the second number different from the first number.

* * * * *